United States Patent
Sather et al.

(10) Patent No.: US 10,921,845 B2
(45) Date of Patent: Feb. 16, 2021

(54) REAL-TIME CLOCK INTEGRATED CIRCUIT COMPRISING POWER MANAGEMENT FUNCTIONS

(71) Applicant: CYMBET Corporation, Elk River, MN (US)

(72) Inventors: Jeffrey S. Sather, St. Michael, MN (US); Steve W. Tonkin, Eden Prairie, MN (US); Jeffrey D. Mullin, Elk River, MN (US)

(73) Assignee: CYMBET Corporation, Elk River, MN (US)

( * ) Notice: Subject to any disclaimer, the term of this patent is extended or adjusted under 35 U.S.C. 154(b) by 33 days.

(21) Appl. No.: 16/086,718

(22) PCT Filed: Mar. 27, 2017

(86) PCT No.: PCT/US2017/024249
§ 371 (c)(1),
(2) Date: Sep. 20, 2018

(87) PCT Pub. No.: WO2017/172581
PCT Pub. Date: Oct. 5, 2017

(65) Prior Publication Data
US 2019/0101951 A1    Apr. 4, 2019

Related U.S. Application Data

(60) Provisional application No. 62/315,357, filed on Mar. 30, 2016.

(51) Int. Cl.
*G06F 1/06*    (2006.01)
*H01M 10/0562*    (2010.01)
(Continued)

(52) U.S. Cl.
CPC .................. *G06F 1/06* (2013.01); *G06F 1/26* (2013.01); *G06F 1/263* (2013.01); *G06F 1/32* (2013.01);
(Continued)

(58) Field of Classification Search
CPC ... G06F 1/06; G06F 1/26; G06F 1/263; G06F 1/32; G06F 1/3237; G06F 1/3287; G06F 1/3296; H01M 10/0585
(Continued)

(56) References Cited

U.S. PATENT DOCUMENTS 5,739,596 A * 4/1998 Takizawa ................ G06F 1/263
                                                                307/64
6,879,134 B2 * 4/2005 Stanesti ................ H02J 7/0069
                                                                320/135
(Continued)

OTHER PUBLICATIONS

International Search Report for International Application No. PCT/US2017/024249, dated Jul. 6, 2017 (3 pages).

*Primary Examiner* — Paul R. Myers
(74) *Attorney, Agent, or Firm* — Kagan Binder, PLLC

(57) ABSTRACT

A real time clock and power management integrated circuit consists of a) an RTC block comprising an internal clock generator for generating a system clock signal that controls a device and b) a power management block. The power management block comprises primary and backup power source connections, a Feed Power Downconverter Component, a backup power source charger power booster/regulator component to increase or regulate voltage from the primary power source to a predetermined charger input voltage, a charge control logic component, a backup power source cut-off logic component, and a mode control logic component to enable operation of the charge control logic component and the battery cut-off logic component under predetermined conditions.

13 Claims, 2 Drawing Sheets

(51) Int. Cl.
    *H01M 10/0585*    (2010.01)
    *G06F 1/26*    (2006.01)
    *G06F 1/3237*    (2019.01)
    *G06F 1/3287*    (2019.01)
    *G06F 1/3296*    (2019.01)
    *H01M 10/052*    (2010.01)
    *G06F 1/32*    (2019.01)

(52) U.S. Cl.
    CPC .......... *G06F 1/3237* (2013.01); *G06F 1/3287* (2013.01); *G06F 1/3296* (2013.01); *H01M 10/052* (2013.01); *H01M 10/0562* (2013.01); *H01M 10/0585* (2013.01); *Y02E 60/10* (2013.01)

(58) Field of Classification Search
    USPC ........................................................ 713/500
    See application file for complete search history.

(56) References Cited

U.S. PATENT DOCUMENTS

| | | | |
|---|---|---|---|
| 7,564,220 B2* | 7/2009 | Niculae | H02J 7/02 320/131 |
| 8,350,532 B2* | 1/2013 | Caraghiorghiopol | G06F 1/263 320/140 |
| 2008/0155289 A1 | 6/2008 | Fernald et al. | |
| 2009/0113222 A1 | 4/2009 | Lee | |
| 2013/0124895 A1 | 5/2013 | Saha et al. | |
| 2014/0008984 A1 | 1/2014 | Kamiyama et al. | |
| 2014/0145680 A1 | 5/2014 | Mullin et al. | |

* cited by examiner

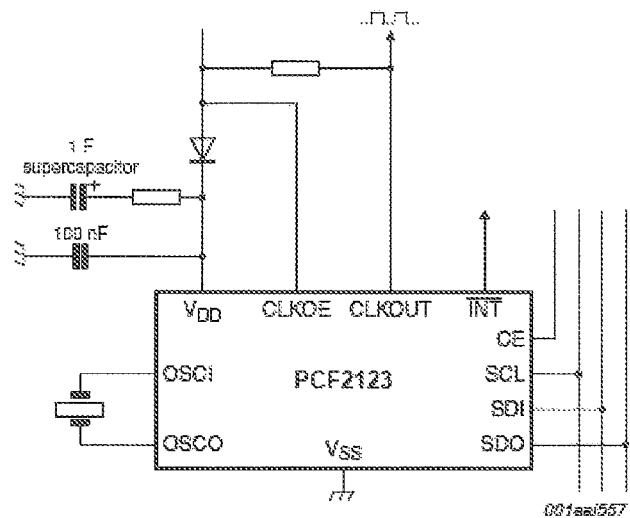
Figure 1 (Prior Art). Backup Power Source Connected to VDD of RTC.
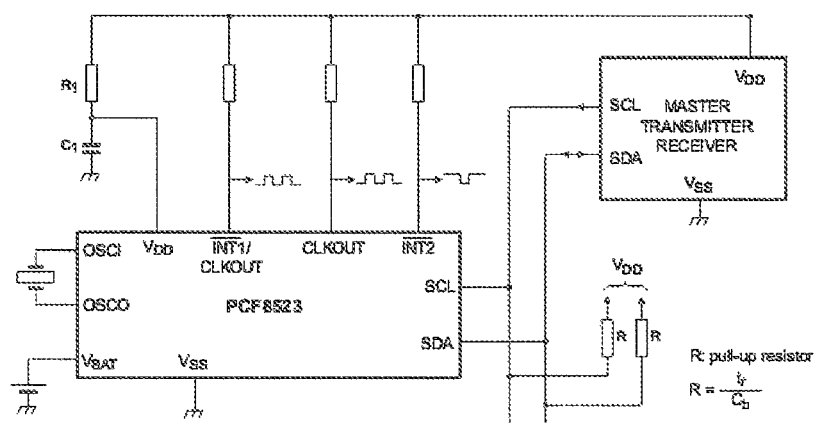
Figure 2. (Prior Art) Backup Power Source Connected to VBAT of RTC.

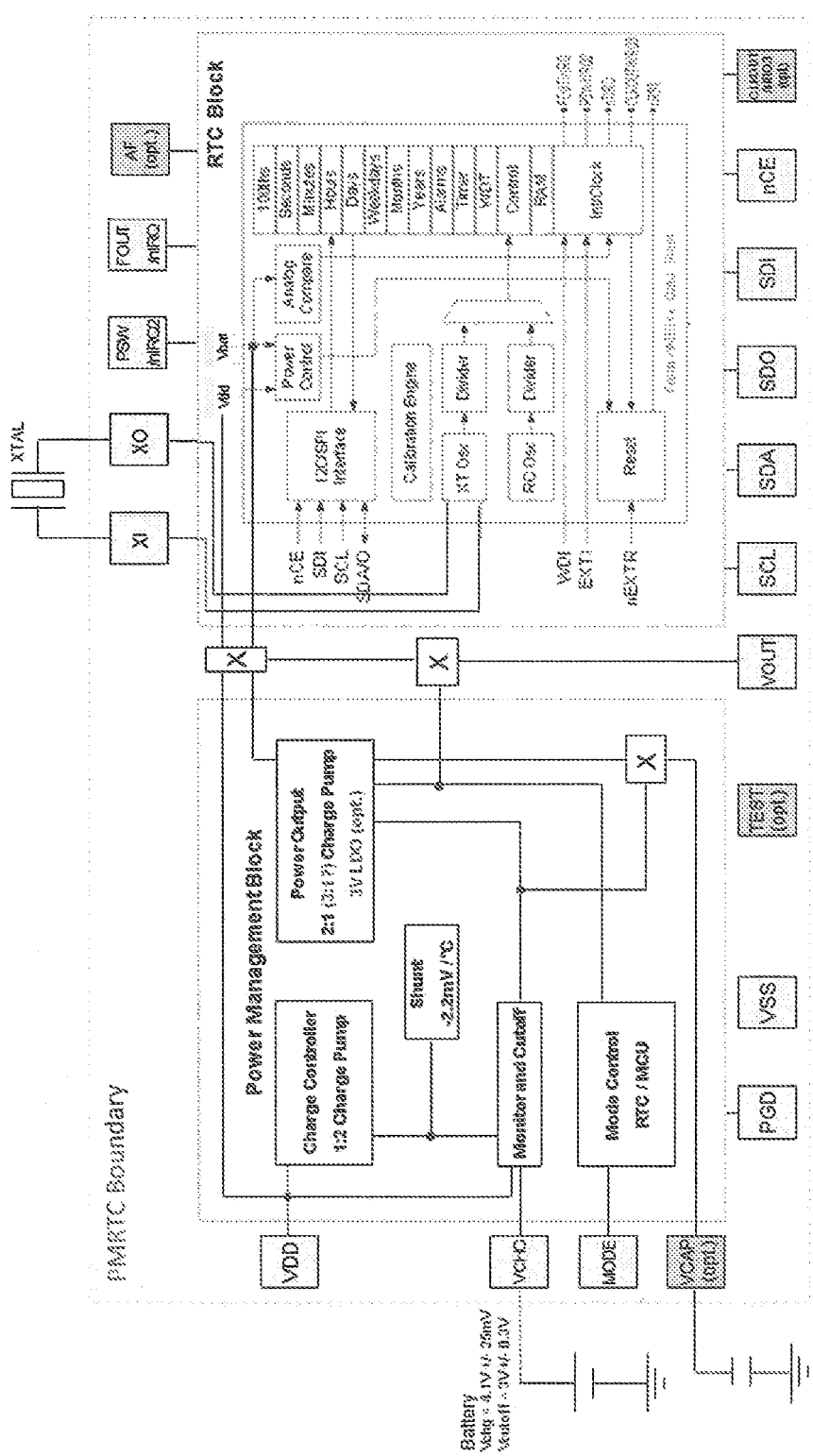
Figure 3. Block Diagram of the PMRTC.

REAL-TIME CLOCK INTEGRATED CIRCUIT COMPRISING POWER MANAGEMENT FUNCTIONS

CROSS-REFERENCE TO RELATED APPLICATIONS

This application claims priority to International Application No. PCT/US2017/024249, filed Mar. 27, 2017 and titled "REAL-TIME CLOCK INTEGRATED CIRCUIT COMPRISING POWER MANAGEMENT FUNCTIONS," which in turn claims priority from a U.S. Provisional Application having Ser. No. 62/315,357, filed Mar. 30, 2016 and titled "REAL-TIME CLOCK INTEGRATED CIRCUIT COMPRISING POWER MANAGEMENT FUNCTIONS," both of which are incorporated herein by reference in their entireties.

FIELD OF THE INVENTION

The present invention relates to a real time clock integrated circuit.

BACKGROUND OF THE INVENTION

Commercially available Real-Time Clocks (RTCs) are often supported by super-capacitors, primary batteries, and secondary batteries as backup power sources to maintain RTC operation when main power is lost. The same is generally true of memory chips (SRAM, for example) and microcontrollers (MCUs) containing RTCs and volatile memory.

In some embodiments, the backup power source is connected to the VDD pin of the RTC and delivers power when the main power source is lost (grid power outage, main battery exhausted, etc.). This configuration is shown in FIG. 1. The backup power source is charged from the main power source, when available.

An alternative configuration connects the backup power source to a backup power pin, as shown in FIG. 2.

SUMMARY OF THE INVENTION

Manufacturers of devices that use various backup power sources to assure operation of various circuits have to use specifically tailored power management systems for design of the devices. It has been discovered that a key point in system design where flexibility and standardization of operation may be achieved is at the real-time clock integrated circuit. By incorporation of key power management features in a circuit comprising an RTC block that carries out traditional real time clock functions, one can provide a valuable tool for the device designer in providing highly flexible power management functions that can be used with a wide variety of backup power source in combination with features that enable the RTC block and any downstream circuits to operate at lower overall power consumption. Reduction of power consumption by the RTC block and any downstream circuits extends the operating life of the backup power source.

In an embodiment, a real time clock and power management integrated circuit consists of:
a) an RTC block comprising an internal clock generator for generating a system clock signal that controls a device; and
b) a power management block comprising:
i) a primary power source connection for connection of the circuit to a primary power source,
ii) a backup power source connection for connection of the circuit to a backup power source,
iii) a Feed Power Downconverter Component configured to reduce voltage potential from the backup power source prior to feeding power to the RTC block by a factor of at least 3:2,
iv) a backup power source charger power booster/regulator component to increase or regulate voltage from the primary power source to a predetermined charger input voltage,
v) a charge control logic component configured to control the level of charge of the backup power source,
vi) a backup power source cut-off logic component to cease current draw on the backup power source under predetermined conditions, and
vii) a mode control logic component operably coupled to the charge control logic component and the battery cut-off logic component to enable operation of the charge control logic component and the battery cut-off logic component under predetermined conditions.

The present circuit that consists only of the RTC block and the power management block provides a unique combination of functionalities in a unit that is ready to be connected to a larger system comprising, for example, operation functionalities that are not RTC functionalities, and additionally with power sources, whether they are primary or backup power sources. Circuits as described herein afford exceptional design flexibility combined with convenience of provision of valuable functionalities useful in a broad spectrum of end use devices. The basic circuit combination as set forth herein provides functionalities that would otherwise only be available in custom designed circuitry, while taking advantage of economies of scale made possible by usefulness of the present circuit in many products.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows:

FIG. 1 is a circuit diagram of a prior art circuit.
FIG. 2 is a circuit diagram of a prior art circuit.
FIG. 3 is a circuit diagram of an embodiment of the present real time clock integrated circuit.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

The RTC Block

The RTC block comprises an internal clock generator for generating a system clock signal that controls a device. In an embodiment, the RTC block comprises one or more of clock functions, calendar functions, alarms, interrupts, and such other functions typical of commercially available RTCs. In an embodiment, the RCT block comprises one or more functions selected from counters for hundredths, seconds, minutes, hours, date, month, year, century, and weekday based on a 32.768 kHz oscillator; an automatic leap year calculation; an alarm capability on all counters; 1-2 general purpose outputs and programmable timer for power cycling external components; 64 bytes of RAM; calibration options from +/−2 ppm (crystal) to +/−16 ppm (RC); automatic calibration of RC oscillator to crystal oscillator; and I2C- and SPI-bus options, configurable at wafer test.

In an embodiment, the RTC block and any downstream circuits are able to operate in an "Ultra-low" power consumption format, which is desired in all operating modes. Functional blocks should be disabled, where possible, when the respective function is not essential in any given operating mode. In an embodiment, the RTC block and any downstream circuits configured to operate at voltages of from about 0.3V to about 3.3V.

In an embodiment, the RTC block operating current is 50 nA or less, at an accuracy of ±2 ppm at a given temperature and assuming an external crystal supporting such accuracy. In an embodiment, an internal pull-down FET to support a power manager function that sinks current through the ground line of an external component such as a microcontroller (MCU) is used. The resistance of this FET is determined based on estimated area it will occupy for the selected technology node.

The Power Management Block

The power management block comprises a number of features for controlling power input, backup power source usage and recharge, and power delivery to the RTC block and any downstream circuits that may be connected to the RCT block.

Primary Power Source

In an embodiment, the primary power source to be connected to the present circuit is selected from one or more of the following:

A rechargeable Li-ion battery, the power being provided at any given voltage. In embodiments, the Li-ion battery has an output voltage range of 3.7V down to 2.7V, nominally.

A primary (i.e., non-rechargeable) coin cell battery, the power being provided at any given voltage. In embodiments, the coin cell battery has a nominal output voltage of 3V-3.3V, down to 2.5V at end of life.

A connection of one or more alkaline primary cells. In an embodiment, a single alkaline primary cell has a voltage of 1.5V when fresh, down to 0.9V at end of life. In an embodiment the primary power source is a connection of 2 or more -series alkaline primary cells, the power being provided at any given voltage. In an embodiment, the 2-series alkaline primary cells have a combined voltage of 3V when fresh, down to 1.8V at end of life.

Wall power regulated to a power rail at any given voltage. In embodiments, the wall power is provided at a voltage selected, for example from about 2.5V, 3.3V, or 5V.

Backup Power Source

In an embodiment, the backup power source to be connected to the present circuit is selected from one or more of the following:

Rechargable batteries, such as Li-based coin cells and solid-state, thin-film microbattery. Examples of thin-film batteries are described in U.S. Pat. Nos. 5,314,765; 5,338,625; 5,445,906; 5,512,147; 5,561,004; 5,567,210; 5,569,520; 5,597,660; 5,612,152; 5,654,084; and 5,705,293, the disclosures of which are expressly incorporated by reference.

Super-capacitors.

Non-rechargable batteries, such as non-rechargeable coin cell batteries.

Feed Power Downconverter Component

In an embodiment, a Feed Power Downconverter Component is configured to reduce voltage potential from the backup power source prior to feeding power to the RTC block by a factor of at least 3:2. In an embodiment, the Feed Power Downconverter Component is a Switch Capacitor DC-DC Downconverter Component. This Feed Power Downconverter Component reduces output energy in an efficient manner to power low-power devices, so that the effective operation of the backup power source is at least twice as long. Use of downconverter technology in the present environment provides a threefold benefit. First, reduction of the voltage provides a $V^2/R$ multiplier advantage leading to significantly reduced power consumption by the load; second, operating at lower voltages leads to less waste of unused energy to operate low power devices; and third, because the amount of current drawn from the backup power source is lower, less power loss is experienced through backup power source internal impedence.

This 3-fold effect can significantly extend the run time of the system for a given energy storage device—whether it be a super-capacitor, primary battery, or rechargeable battery. In the case of batteries having relatively higher output voltage—such as 3.8V in the case of a lithium solid state battery—the run time multiple can be higher, as the headroom associated with the DC-DC conversion circuitry can be made low enough that the entire discharge of the battery can be completed while maintaining a voltage to the RTC that is above its minimum operating voltage. In some cases, the DC-DC conversion can be as much as 3:1, extending the run time further. As a result, a storage device of a given capacity can provide much longer run time; or, conversely, the storage device can be made smaller and perhaps less expensively than would otherwise be necessary to provide a given amount of run time in the absence of such a DC-DC converter being placed between the storage device and the circuit element being powered.

Additionally, because less current is drawn from the backup power source that is a microbattery, the operation temperature of the microbattery is expanded. A microbattery at lower temperature exhibits higher impedance than the same microbattery at a higher temperature. Because the present system permits operation of the same devices with less current, the microbattery's effective temperature range is expanded to include efficient operation at lower temperatures. Similarly, as a microbattery is exposed to multiple cycles, the level of impedance of the microbattery increases. Because the present system permits operation of the same devices with less current, microbatterries controlled by the present system require fewer cycles to do the same amount of work, increasing the life of the microbattery.

In an embodiment, the backup power source when in backup mode will deliver power to the RTC block at a voltage potential that is reduced by an integer ratio of from 3:2 to 5:1, and for example integer ratios such as 2:1, 3:1, 3:2, 4:1, or 5:1. In an embodiment, the Feed Power Downconverter Component delivers power to the RTC block at a voltage potential of from about 0.3V to about 3.3V.

Downconversion of the voltage delivered by the system to the RCT block in this manner significantly extends the life of the backup power source when the backup power source is a battery, making a battery having a capacity of, for example, 5 μAh perform like a battery having a capacity of 10 or 15 μAh using conventional control technology.

In an embodiment, a Feed Power Downconverter Component is configured to reduce voltage potential from the primary power source prior to feeding power to the RTC block by a factor of at least 3:2. In an embodiment, the Feed Power Downconverter Component is configured to deliver power to the RTC block from the primary power source at a voltage potential that is reduced by an integer ratio of from 3:2 to 5:1, and for example integer ratios such as 2:1, 3:1, 3:2, 4:1, or 5:1.

In an embodiment, the RTC block will operate at potentials down to ~1.1V, especially in backup mode. It is expected that the RTC block will have two power inputs—one directly from the main power supply, the other through a VBAT input driven indirectly by the backup battery to be co-packaged with the PMRTC. A comparator will control RTC functions depending on whether the main supply is above or below the VBAT potential, and possibly as a function of other voltage levels as well.

The interface bus is to be selectable as SPI or I2C at wafer level test/programming. In backup mode, the interface bus will be inactive.

Backup Power Source Charger Power Booster/Regulator Component

The real time clock integrated circuit additionally comprises a backup power source charger power booster/regulator component to increase or regulate voltage from the primary power source to a predetermined charger input voltage. This is desirable, because conventional real time clock integrated circuits that operate from 3.3V (and lower) primary power source voltages cannot charge Li-ion coin cells, Li-polymer cells, or thin film lithium batteries requiring 4.1V or higher charge voltage. In fact, when the primary power source voltage is 2.5V or lower, it is not possible to charge many of the Li-based coin cells at all; and in the case of a super-capacitor being employed as the backup power source, the lower supply voltage available to charge the capacitor severely limits the available charge from the capacitor, especially because the capacitor voltage decays linearly with the amount of charge removed.

In an embodiment, the backup power source charger power booster/regulator component comprises a capacitor-based charge pump that boosts the primary supply voltage to at least 4.1V from an input voltage of ~2.1V to 5.5V for the purpose of charging a solid state battery at 4.1V±25 mV at room temperature. In an embodiment, the backup power source charger power booster/regulator component comprises a capacitor-based charge pump that boosts the primary supply voltage to at least 3V-3.3V from an input voltage of ~2.1V to 5.5V when charging super-capacitors and a variety of Li-ion coin cells.

In an embodiment, the backup power source charger power booster/regulator component is a Dual-Mode Charge Pump. This component is a multi-purpose capacitive charge pump that pumps the VDD input voltage up by up to 2:1 to allow charging a 4.1 Volt (or 3V-3.3V) battery from as low as a ~2.2 Volt VDD input voltage. It is also used to pump the 4.1 Volt battery voltage down by 2:1 to provide one-half the battery voltage to the VOUT pin, effectively doubling the μAh rating of the battery on applications that can run at one-half, or less, the battery voltage at lower currents.

Charge Control Logic Component

In an embodiment, the real time clock integrated circuit comprises a charge control logic component configured to control the level of charge of the backup power source. Charge control logic measures and controls the input voltage to be applied to the backup power source according to predetermined values or by values set by external interface. For example, the input voltage to be applied to a thin film microbattery cell may be set at 4.1 V, and may alternatively be set at a higher or lower potential by an eternal interface. The charge control logic component turns off the input voltage for reduced power consumption once battery is charged. In an embodiment, the charge control logic component operates without aid of off-chip components.

For rechargeable Li-ion batteries, the nominal operating voltage is set by the electrochemical potential between metallic lithium (anode or negative electrode) and the cathode material in the positive electrode. For many systems, this is typically 4.1V. In the case of a lithium battery, if the battery is charged to less than nominal voltage, say 4.05 or 4.0V, or even lower, then more Li remains in the cathode, thus increasing its structural integrity. In an embodiment, the backup power source battery is charged to less than nominal voltage. In an embodiment, the backup power source battery is charged to a voltage of about 4.05 or about 4.0V.

In an embodiment, the charge control logic comprises a user controlled input having selection capability for the user to choose from a plurality of levels of state of charge of the battery. In an embodiment, the state of charge is controlled in at least one of the state of charge levels by limiting the charge potential to less than 4.05V. In an embodiment, the state of charge is controlled in at least one of the state of charge levels by limiting discharge potential to more than 2.0V. Charge control systems and desirable battery charge ranges under various conditions are described in US Patent Application Publication No. 2014/0055085, the disclosure of which is expressly incorporated herein by reference.

Backup Power Source Cut-Off Logic Component

The real time clock integrated circuit additionally comprises a backup power source cut-off logic component to cease current draw on the backup power source under predetermined conditions.

One purpose of a backup power source cut-off logic component is to disconnect the backup power source when its voltage drops to a critical threshold. While such discharge cutoff is not required by super-capacitors or by some rechargeable coin cell batteries, it is imperative to employ such a circuit when using many of the lithium/lithium-ion cells in order to prevent over-discharge, as this condition can damage or destroy the cell.

Mode Control Logic Component

A mode control logic component is operably coupled to the charge control logic component and the battery cut-off logic component to enable operation of the charge control logic component and the battery cut-off logic component under predetermined conditions. The Mode Control logic component determines if the primary power source has been disconnected so the device is operating on battery power, whether the battery is in need or charging, and whether the battery should be cut off as a power source to the device when operating in two terminal mode. Upon restoration of power from the primary power source, Mode Control logic component restarts battery charge operations by turning on Charge Controller. Optionally, Mode Control logic component may be provided with a reset line or other signal transfer component, which provides a signal to external components to inform that the system is in charging mode, and is not running off of backup battery power.

In an embodiment, the switchover from operation using the primary power source to use of the backup power source is automatic, with no requirement for off-chip operation to implement power source switchover. In an embodiment, the switchover transition from primary power source to backup power source does not draw surge current.

In an embodiment, an internal comparator monitors VDD and, when VDD falls below a threshold, the RTC derives its power from the backup power source via the separate power pin (typically designated VBAT or VBACKUP). In an embodiment, a trickle charge function is available from within the RTC power management block that routes main power to the backup power source directly, or through a user-configurable arrangement of diodes and/or resistors. In an embodiment, the trickle charge function can be disabled, as would be done when using a primary (i.e., non-rechargeable) battery as the backup power source.

A charge voltage slope of −2.2 mV/° C. from room temperature to 85° C. is preferred, with a flat 4.1V charge voltage at temperatures below ~25° C. A shunt regulator function is necessary to deplete charge from the battery at elevated temperatures, in the event the battery is charged at a lower temperature, the charging cycle is terminated, and the ambient temperature subsequently climbs. Without a shunt function, the battery voltage will be above the voltage it would otherwise have been charged to using eh −2.2 mV/° C. charge profile. For the sake of reducing power drain from the main supply, the charging circuit is to be self-terminating based on algorithms defined by ambient temperature and elapsed charging time. Automatic restart of the charging function is to begin after a certain amount of time has elapsed since the prior charge cycle was terminated, or upon resumption of main power after a power interruption.

Specific architecture of examples of various components of the present power management components, such as the Switch Capacitor DC-DC Downconverter Component, the backup power source charger power booster/regulator component, the charge control logic component, the backup power source cut-off logic component, and the mode control logic component are provide in U.S. patent application Ser. No. 13/688,986, filed Nov. 29, 2012 and having the title THIN FILM MICROBATTERY CHARGE AND OUTPUT CONTROL, the disclosure of which is expressly incorporated herein by reference.

In an embodiment, the RTC block and the power management block of the real time clock and power management integrated circuit are provided as a monolithic chip, ready to be connected to a larger system comprising, for example, components comprising operation functionalities that are not RTC functionalities, and additionally with power sources, whether they are primary or backup power sources. In an embodiment, the RTC block and the power management block of the real time clock and power management integrated circuit are provided on separate physical chips that are physically connected, for example by being bonded to a common substrate In an embodiment, the real time clock circuit integrated circuit is provided with a backup power source as a copackaged unit. In an embodiment, the backup power source provided in the copackaged unit is a thin film lithium battery.

EXAMPLE

A block diagram of a power management real time clock ("PMRTC") is shown in FIG. 3. The diagram indicates the presence of a number of pins that are described below.

Control

This block represents all control functions and voltage detection functions. It controls all other blocks and outputs the PGOOD signal.

Oscillator

This block provides a relatively slow output clock with 20% active high duty cycle for use by application circuits. It must operate without aid of an external crystal oscillator.

Cutoff

This block is an extremely low-leakage cutoff switch that is cut off whenever the battery is below 3.0 Volts for over 100 milliseconds. This important block protects the Lithium-Ion battery from over-discharging, which can be fatal to the battery.

Dual-Mode Charge Pump

This block is a multi-purpose capacitive charge pump that pumps the VDD input voltage up by up to 2:1 to allow charging a 4.1 Volt battery from as low as a ~2.2 Volt VDD input voltage. It is also used to pump the 4.1 Volt battery voltage down by 2:1 to provide one-half the battery voltage to the VOUT pin, effectively doubling the μAh rating of the battery on applications that can run at one-half, or less, the battery voltage at lower currents

LDO

This block contains a low dropout regulator function that keeps the VOUT output from exceeding 3.5 Volts and provides supplemental output current from the VCAP bus to VOUT when the down pump is either not in operation or cannot provide enough current to power the load by itself.

VCAP Bus

This internal bus is connected directly to the VCAP pin. It is the central power bus of the chip and provides a place to add capacitance to provide for current pulses and also provides a convenient place to access the full VBAT voltage while still protecting the battery with the Cutoff Circuit.

Charge Shunt

TABLE 1

| Pin Name | Description |
| --- | --- |
| VDD | Supply voltage; positive or negative steps in VDD can affect oscillator performance; recommend 100 nF decoupling close to the device |
| VSS | Ground |
| XI | Oscillator input; high-impedance node; minimize wire length between quartz and package |
| XO | Oscillator output; high-impedance node; minimize wire length between quartz and package |
| PSW/nIRQ2 | Power switch/Interrupt 2/Output |
| FOUT/nIRQ | Interrupt 1/Function output-(note this is an open drain output) |
| AF | Autocalibration filter |
| CLKOUT | Clock output (open-drain) |
| nCE | RTC SPI chip select |
| SDI | Serial data input; may float when CE is inactive |
| SDO | SPI-bus data output |
| SDA | I²C data input/Output |
| SCL | I²C clock input |
| VOUT | |
| TEST | Test pin; not user accessible; connect to VSS or leave floating (internally pulled down) |
| PGD | Output indicating VDD is greater than the battery charge pump turn-on voltage |

TABLE 1-continued

| Pin Name | Description |
| --- | --- |
| VCAP | Connected to internal power bus; for high pulse current applications, attach a capacitor to this pin. |
| MODE | User selectable control of RTC and MCU operating mode-enables VOUT |
| VCHG | 4.1 V (typical) charging source |

In operation of embodiments of the present real time clock integrated circuit, the following Functional Description applies.

Common Features

The PMRTC operates in three modes depending on the state of the MODE pin on VDD power on. Connect the MODE pin to either GND, nothing, or VDD. As VDD rises initially the MODE pin is sampled and the PMRTC will take on one of the modes shown in the table below:

| Mode Pin Connection of VDD at Power On | Mode of Operation |
| --- | --- |
| GROUND | Real-Time Clock Mode |
| OPEN | Microcontroller Mode |
| VDD | Energy Harvesting Mode |

The PMRTC is specifically designed to be able to start up with less than 2 µA of current draw on VDD so that it won't have problems starting from a high impedance power supply such as a solar cell.

Once the PMRTC starts the OSC output pulse train is available and the PGOOD and VOUT pins become valid.

The PMRTC has a battery protection cutoff circuit that disconnects the VBAT pin from the rest of the chip with less than 20 picoamperes of leakage if the battery voltage is drawn down to 3.0 Volts for over 100 milliseconds. This circuit reconnects upon presence of a VDD voltage above $V_{chg}$.

The operations of the various blocks and pins differ with the different modes and are defined in the next few sections per the selected mode.

REAL-TIME CLOCK Operation

In Real-Time Clock (RTC) mode, the PMRTC is designed to provide power to the RTC block.

When VDD rises to above $V_{por}$, the RTC is initially powered directly from VDD via a low-impedance internal switch (or directly). After less than a millisecond, the VDD voltage is measured to determine if it is above $V_{chg}$. If VDD is above $V_{chg}$ the boost charger will start charging the battery and the VCAP bus/pin. If VDD stays above $V_{chg}$ the charger will run for approximately one hour before automatically stepping down to a battery maintaining cycle where it runs at a 1% on or 12% on duty cycle depending on ambient temperature (1% if >25° C. else 12%).

Upon VDD dropping below $V_{bu}$ the PMRTC goes into a battery backup state where the pump module reconfigures itself into a 2:1 voltage dividing pump that provides an output voltage of approximately one-half the battery voltage and sources VDD to power the RTC chip. This effectively doubles the µAh capacity of the battery. The actual output voltage of VDD is specified in the parameters section but is a function of the current draw until the load demands too much current from the pump where the LDO section steps in to supply any temporary current demand. The PMRTC will now stay in the backup state until either VDD is restored or the battery drops below 3.0 Volts for over 100 milliseconds. On VDD restore the charger will again run for approximately one hour and if the battery drops below 3.0 Volts for over 100 milliseconds the cutoff circuit will be invoked to protect the battery.

In Real-Time Clock mode the PGOOD pin goes high whenever VDD is greater than $V_{chg}$ and goes low when VDD is less than $V_{bu}$.

In embodiments, the PMRTC must operate fully from 1.8V to 5.5V. Timekeeping mode must operate from 1V (or 1.2V) to 5.5V; Must operate with or without an integrated thin film battery (such as the Enerchip™ thin film lithium battery commercially available from Cybmet) (i.e., direct connection from VDD to RTC block when no backup battery is available, down to 1V (or 1.2V); and VDD/VBAT comparator must be disabled if no backup battery is connected—for example test programmable or VMODE selectable).

Microcontroller Mode Operation

In Microcontroller mode the PMRTC is designed to provide power to a microcontroller or other chip at an output voltage of either VDD or a voltage between 3.0 and 3.5 Volts.

When VDD rises to above $V_{por}$ VOUT is initially powered directly from VDD via a low-impedance internal switch. After less than a millisecond the VDD voltage is measured to determine if it is above $V_{chg}$. If VDD is above $V_{chg}$ the boost charger will start charging the battery and the VCAP bus/pin. If VDD stays above $V_{chg}$ the charger will run for approximately one hour before automatically stepping down to a battery maintaining cycle where it runs at a 1% on or 12% on duty cycle depending on ambient temperature (1% if >25° C. else 12%).

Upon VDD dropping below $V_{bu}$ the PMRTC goes into a battery backup state where the VOUT pin is powered by the battery through the LDO section to provide a voltage between 3.0 Volts and 3.5 Volts to power the load chip. The PMRTC will now stay in the backup state until either VDD is restored or the battery drops below 3.0 Volts for over 100 milliseconds. On VDD restore the charger will again run for approximately one hour and if the battery drops below 3.0 Volts for over 100 milliseconds the cutoff circuit will be invoked to protect the battery.

In Microcontroller mode the PGOOD pin goes high whenever VDD is greater than $V_{chg}$ and goes low when VDD is less than $V_{bu}$.

In operation of embodiments of the present real time clock integrated circuit, the following General Timing Specifications are preferably met.

1. Charge state to idle state criteria. Charging time is on a 1% duty cycle. However, when leaving Backup state or Cutoff state, run 100 consecutive charging cycles without significant delay between cycles. Initiate 1% duty cycle charging after the 100 consecutive cycles.

See Table 2 below. Note: Temperature breakpoints don't need to be precise, nor do charging times.

TABLE 2

| Temperature (° C.) | | Charge Time per 100 Cycles |
|---|---|---|
| MIN | MAX | (hours) |
| −40 | −20 | 16 (or always on) |
| −20 | 0 | 8 |
| 0 | 40 | 2 |
| 40 | 85 | 0.5 |

2. VDD to battery switchover time shall be 1 us or less (0.2 us typical).

3. Switchover time from the backup state to VDD shall be 1 us or less (0.2 us typical) when transitioning out of backup mode. Defined as the time to switch SS1 on, to avoid VOUT collapsing as entire system is connected to VOUT.

In operation of embodiments of the present real time clock integrated circuit, the following Characteristic Specifications are preferably met.

POWER SUPPLY CURRENT
CHARACTERSTICS $T_a = -40°$ C. to $+85°$ C.

| CHARACTERISTIC | SYMBOL | CONDITION | MIN | MAX | UNITS |
|---|---|---|---|---|---|
| VDD Supply Current | $I_{DDSU}$ | VDD below 1.8 V | — | 200 | nA |
| VDD Startup Current Pulse *1 | $I_{DDCP}$ | VDD above 1.8 V. Pulse < 500 uS | — | 500 | uA |

CHARGER CHARACTERISTICS $T_a = -40°$ C. to $+85°$ C.

| CHARACTERISTIC | SYMBOL | CONDITION | MIN | MAX | UNITS |
|---|---|---|---|---|---|
| Charging Current to VBAT | $I_{CHG}$ | Charger on, VDD = 2.2 V | 50 | — | uA |
| Charging Current to VBAT | $I_{CHG}$ | Charger on, VDD = 3.3 V | 200 | — | uA |
| Charger Quiescent Current Excluding $I_{CHG}$ | $I_{CHGQ}$ | Charger on, VDD = 2.2 V | — | 200 | nA |

TIMING CHARACTERISTICS $T_a = -40°$ C. to $+85°$ C.

| CHARACTERISTIC | SYMBOL | CONDITION | MIN | MAX | UNITS |
|---|---|---|---|---|---|
| CLK Output Frequency | $F_{CLK}$ | | 0.24 | 0.25 | HZ |
| CLK High Period | $T_{CLKH}$ | | 450 | 550 | mS |

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All percentages and ratios used herein are weight percentages and ratios unless otherwise indicated. All patents, patent applications (including provisional applications), and publications cited herein are incorporated by reference as if individually incorporated for all purposes. Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A real time clock and power management integrated circuit consisting of:
   a) an RTC block comprising an internal clock generator for generating a system clock signal that controls a device; and
   b) a power management block comprising:
      i) a primary power source connection for connection of the circuit to a primary power source,
      ii) a backup power source connection for connection of the circuit to a backup power source,
      iii) a Feed Power Downconverter Component configured to reduce voltage potential from the backup power source prior to feeding power to the RTC block by a factor of at least 3:2,
      iv) a backup power source charger power booster/regulator component to increase or regulate voltage from the primary power source to a predetermined charger input voltage,
      v) a charge control logic component configured to control the level of charge of the backup power source,
      vi) a backup power source cut-off logic component to cease current draw on the backup power source under predetermined conditions, and
      vii) a mode control logic component operably coupled to the charge control logic component and the battery cut-off logic component to enable operation of the charge control logic component and the battery cut-off logic component under predetermined conditions.

2. The real time clock and power management circuit integrated of claim 1, wherein the components are configured for connection to a backup power source that is a rechargeable thin film microbattery.

3. The real time clock and power management circuit integrated of claim 1, wherein the components are configured for connection to a backup power source that is a rechargeable lithium thin film microbattery.

4. The real time clock and power management circuit integrated of claim 1, wherein the components are configured for connection to a backup power source that is a supercapacitor.

5. The real time clock and power management circuit integrated of claim 1, wherein the Feed Power Downconverter Component is a Switch Capacitor DC-DC Downconverter Component.

6. The real time clock and power management circuit integrated of claim 1, wherein the Feed Power Downconverter Component is configured to reduce voltage potential from the backup power source prior to feeding power to the RTC block by a factor selected from 3:1, 3:2, 4:1, or 5:1.

7. The real time clock and power management circuit integrated of claim 1, wherein the Feed Power Downconverter Component is configured to reduce voltage potential from the primary power source and the backup power source prior to feeding power to the RTC block by a factor of at least 2:1.

8. The real time clock and power management circuit integrated of claim 1, wherein the Feed Power Downconverter Component is configured to reduce voltage potential from the primary power source prior to feeding power to the RTC block by a factor selected from 3:1, 3:2, 4:1, or 5:1.

9. The real time clock and power management circuit integrated of claim 1, wherein the Feed Power Downconverter Component is configured to deliver power to the RTC block at a voltage potential of from about 0.3V to about 3.3V.

10. The real time clock and power management circuit integrated of claim 1, wherein the backup power source charger power booster/regulator component is configured to boost and/or regulate the primary supply voltage to at least 4.1V from an input voltage of ~2.1V to 5.5V for the purpose of charging a solid state battery.

11. The real time clock and power management circuit integrated of claim 1, wherein the backup power source charger power booster/regulator component is configured to boost and/or regulate the primary supply voltage to at least 3V-3.3V from an input voltage of ~2.1V to 5.5V for the purpose of charging a super-capacitor or a rechargeable coin cells.

12. A copackaged unit consisting of the real time clock and power management circuit integrated of claim 1 copackaged together with a backup power source.

13. The copackaged unit of claim 12, wherein the backup power source provided in the copackaged unit is a thin film lithium battery.

* * * * *